Figure 1:
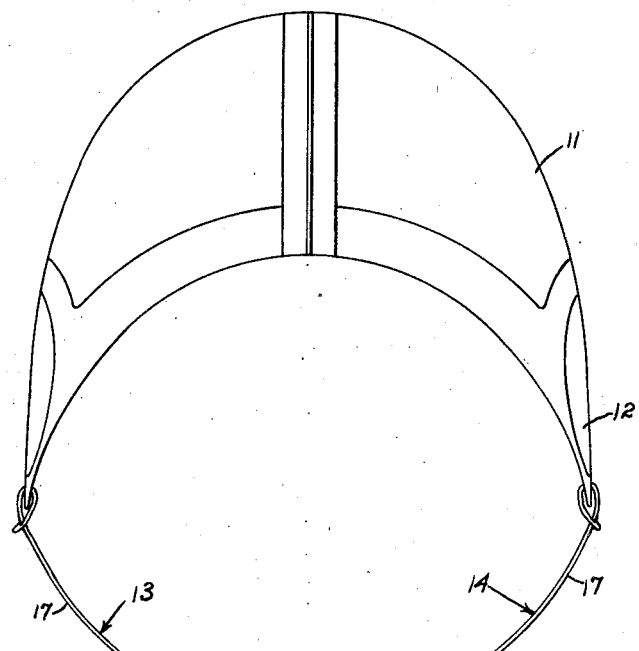

June 18, 1929.　　　T. W. MILLER　　　1,718,060

BATHING CAP

Filed Nov. 7, 1927

Thomas W. Miller
　　　Inventor
By Smith & Freeman
　　　Attorneys

Patented June 18, 1929.

1,718,060

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

BATHING CAP.

Application filed November 7, 1927. Serial No. 231,427.

Figure 2:
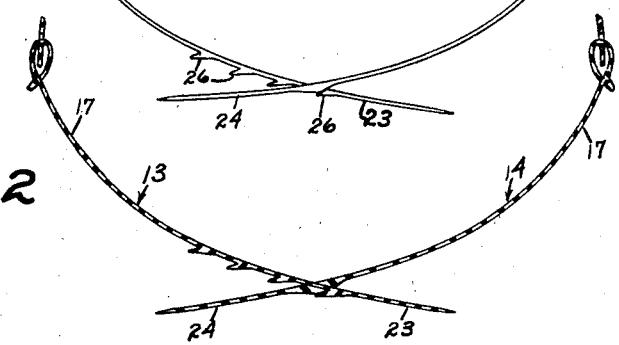
Figure 3:
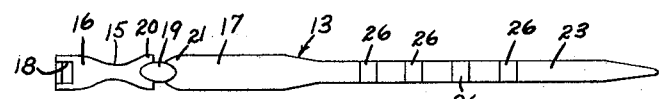
Figure 4:
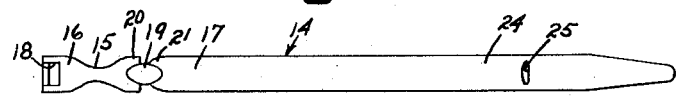
Figure 5:
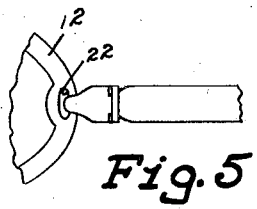

My invention relates to bathing caps, and the principal object of my invention is to provide new and improved means for securing bathing caps in position upon the heads of the wearers. In the drawings accompanying this specification and forming a part of this application I have shown, for purposes of illustration, one form which my invention may assume, and in these drawings:

Figure 1 is a general front view of the embodiment of my invention herein shown, Figure 2 is a fragmentary view taken parallel to Figure 1 but showing the securing straps and the adjacent portion of the cap in section, Figure 3 is a plan view of the left hand securing strap, Figure 4 is a plan view of the right hand securing strap, while Figure 5 is a fragmentary view showing either of the straps applied to the cap.

Herein I have shown a rubber bathing cap 11 provided at its sides with tabs 12 to which are attached rubber securing tapes 13 and 14. In the embodiment of my invention herein shown the attached end of each of these rubber securing tapes 13 and 14 is provided with a reduced section 15 dividing the attaching end of the rubber securing tape 13 or 14 into an extension 16 and a body 17, the extension 16 is provided with an aperture 18, the body 17 is provided with a reduced part 19 flanked by shoulders 20 and 21, and the rubber securing tapes 13 and 14 are secured to the tabs 12 in each case by inserting the extension 16 through a suitable aperture 22 in the corresponding tab 12 until the reduced portion 15 lies within the aperture 22, by doubling back the extension 16 until it lies against the body 17, and by then drawing the rubber securing tape 13 or 14 through the extension aperture 18 until the reduced part 19 of the body 17 lies within the extension aperture 18 and the shoulders 20 and 21 of the body 17 are abutting the two faces of the extension 16 adjacent the extension aperture 18.

It of course will be obvious to those skilled in the art that the rubber securing tapes 13 and 14 may be so assembled because of the fact that both the bathing cap 11 and the securing tapes 13 and 14 are formed of rubber and therefore are resilient, and at the same time it will be understood by those skilled in the art that while the rubber securing tapes 13 and 14 may be disassembled by mere reversal of the process by which they were assembled yet in the interim they are held against accidental disassembly from the cap 11 both by the abutment of the shoulders 20 and 21 against the faces of the extension 16 laterally of the extension aperture 18 and also because any tension on either of the rubber securing tapes 13 and 14 is directed onto the body 17 rather than onto the extension 16 and therefore is in a direction to maintain the securing tapes assembled rather than to cause disassembly thereof.

Continuing the body 17 of the securing tape 13 is a tail 23, and continuing the body 17 of the securing tape 14 is a tail 24 provided with an aperture 25 formed to grippingly receive the tail 23 of the securing tape 13 whereby the cap may be held assembled upon the head of the wearer by passing the tail 23 of the securing tape 13 through the aperture 25 in the tail 24 of the securing tape 14 and drawing up until the two tapes 13 and 14 form a continuous strap extending from one side of the bathing cap beneath the chin of the wearer to the other side of the bathing cap and obviously effective to hold the bathing cap in position.

In order to facilitate adjustment of the tapes 13 and 14 to correspond to the contour of the head of the wearer of the cap I form the tab apertures 22 somewhat larger than the reduced sections 15 of the tapes 13 and 14 to permit the tapes 13 and 14 to swivel relative to the tabs 12, and in order to provide means for holding the tail 23 of the tape 13 within the aperture 25 of the tail 24 of the tape 14 additional to the mere resiliency of the tails 23 and 24 I provide the outer surface of the tail 23 with a plurality of ridges 26 spaced at suitable intervals to provide for adjustment between the tapes 13 and 14 and each adapted to engage the face of the tail 24 adjacent the aperture 25 to additionally hold the tapes interengaged.

Of course it will be apparent to those skilled in the art that I have provided bathing cap fastening means formed entirely from rubber and requiring no metal whatever, and at the same time it also must be apparent that I have provided these means in a pleasing and attractive form, and that the attractiveness is probably considerably enhanced by the fact that the tapes meet beneath the chin of the wearer rather than elsewhere. Under these circumstances it of course will be apparent to those skilled in the art that I have disclosed herein a device accomplishing at least the principal object of my invention. At the same time those skilled in the art will realize that the particular embodiment of my invention herein shown and disclosed embodies advantages other than those particularly pointed out or suggested herein, and also that this particular embodiment of my invention herein shown may be variously changed and modified without departing from the spirit of my invention or sacrificing these advantages, and it therefore will be understood that the disclosure herein is illustrative only, and that my invention is not limited thereto.

I claim:—

1. In a rubber bathing cap unit comprising a rubber bathing cap having a resilient rubber tape secured to one side thereof and a resilient rubber portion associated with the other side thereof: said tape, and said portion, said portion being provided with an aperture formed to receive said tape in desired lengths, and to grip said tape when said tape has been so received.

2. In a rubber bathing cap unit comprising a rubber bathing cap having a resilient rubber tape secured to one side thereof and a resilient rubber portion associated with the other side thereof: said tape, and said portion, said portion being provided with an aperture formed to receive said tape in desired lengths, and to grip said tape when said tape has been so received, and said tape being provided with projections for releasably securing said tape in gripped position.

3. In a rubber bathing cap unit comprising a rubber bathing cap having a resilient rubber tape secured to one side thereof and a resilient rubber portion associated with the other side thereof: said tape, and said portion, said portion being provided with an aperture formed to receive said tape in desired lengths, and to grip said tape when said tape has been so received, and said tape being provided with projections for releasably securing said tape in gripped position, said projections being built-up portions forming solid ridges on said tape.

4. In a rubber bathing cap unit comprising a rubber bathing cap having a first resilient rubber tape secured to one side thereof and a second resilient rubber tape secured to the other side thereof: said first tape, and said second tape, said second tape being provided with an aperture formed to receive said first tape in desired lengths, and to grip said first tape when said first tape has been so received.

5. In a rubber bathing cap unit comprising a rubber bathing cap having a first resilient rubber tape secured to one side thereof and a second resilient rubber tape secured to the other side thereof: said first tape, and said second tape, said second tape being provided with an aperture formed to receive said first tape in desired lengths, and to grip said first tape when said first tape has been so received, and said first tape being provided with projections for releasably securing said first tape in gripped position.

6. In a rubber bathing cap unit comprising a rubber bathing cap having a first resilient rubber tape secured to one side thereof and a second resilient rubber tape secured to the other side thereof: said first tape, and said second tape, said second tape being provided with an aperture formed to receive said first tape in desired lengths, and to grip said first tape when said first tape has been so received, and said first tape being provided with projections for releasably securing said first tape in gripped position, said projections being built-up portions forming solid ridges on said first tape.

In testimony whereof I hereunto affix my signature.

THOMAS W. MILLER.